United States Patent
Wier

Patent Number: 5,961,147
Date of Patent: Oct. 5, 1999

[54] ANCHORAGE FOR THE BELT BUCKLE OF A SEAT BELT

[75] Inventor: Franz Wier, Göggingen, Germany

[73] Assignee: TRW Occupant Restraint Systems GmbH, Alfdorf, Germany

[21] Appl. No.: 08/861,896

[22] Filed: May 22, 1997

[30] Foreign Application Priority Data

May 28, 1996 [DE] Germany ............ 296 09 436 U

[51] Int. Cl.⁶ .................................. B60R 22/00
[52] U.S. Cl. ...................... 280/801.1; 297/464
[58] Field of Search .............. 297/468, 463.1, 297/471, 485, 464; 280/801.1

[56] References Cited

U.S. PATENT DOCUMENTS

| | | |
|---|---|---|
| 4,569,539 | 2/1986 | Creedon . |
| 4,638,534 | 1/1987 | Sasaki et al. . |
| 4,890,951 | 1/1990 | Morinaga et al. . |
| 4,928,992 | 5/1990 | Qvint et al. . |

FOREIGN PATENT DOCUMENTS

| | | |
|---|---|---|
| 8424775 | 3/1977 | Australia . |
| 2540054 | 8/1984 | France . |
| 2702229 | 7/1977 | Germany . |
| 5411430 | 6/1977 | Japan . |
| 53-26023 | 3/1978 | Japan . |
| 56-136571 | 10/1981 | Japan . |
| 57-203944 | 12/1982 | Japan . |
| 63-46267 | 3/1988 | Japan . |
| 6424653 | 2/1989 | Japan . |
| 1109466 | 7/1989 | Japan . |
| 1502974 | 10/1989 | Japan . |
| 4310452 | 11/1992 | Japan . |
| 2183450 | 1/1987 | United Kingdom . |
| 8303551 | 10/1983 | WIPO . |

*Primary Examiner*—Milton Nelson, Jr.
*Attorney, Agent, or Firm*—Tarolli, Sundheim, Covell, Tummino & Szabo

[57] ABSTRACT

An anchorage for a belt buckle arranged alongside a vehicle seat in a seat belt system is characterized by the belt buckle being affixed to the anchorage and having a laterally deflectable buckle head. The anchorage has a flexible fitting to which the buckle head is secured and which opposes a deflection of the belt buckle towards the vehicle seat a lesser resistance than away from it.

12 Claims, 3 Drawing Sheets

ANCHORAGE FOR THE BELT BUCKLE OF A SEAT BELT

TECHNICAL FIELD

The invention relates to an anchorage for a laterally deflectable belt buckle.

BACKGROUND OF THE INVENTION

Usually, belt buckles are anchored to the vehicle seat or to the vehicle floor by flexible traction cables which, following insertion of the buckle tongue in the buckle head, permit alignment of the belt buckle to approximate the run of the belt webbing. The lower the forces opposing the lateral deflection of the belt buckle, the better the orientation of the belt buckle can be adapted to the run of the belt webbing. When, however, a slight bending moment opposes the lateral deflection of the belt buckle, the belt buckle may laterally deviate on insertion of the buckle tongue, thus making it necessary to design the flexural strength of the buckle anchorage greater than it would be desirable for an optimum run of the belt webbing.

BRIEF SUMMARY OF THE INVENTION

The invention provides an anchorage for a belt buckle arranged alongside a vehicle seat in a seat belt system, said anchorage allowing said belt buckle to be swivelled towards the vehicle occupant relatively easily but which is relatively difficult to be moved in the opposite direction. Accordingly, this anchorage permits, on the one hand, the belt buckle to adapt to the run of the seat belt whilst, on the other, making a shift of the basic position of the belt buckle difficult, if the buckle tongue is not latched in place. The anchorage according to the invention comprises the belt buckle which is affixed to the anchorage and which has a laterally deflectable buckle head. The anchorage has a flexible fitting to which the buckle head is secured and which opposes a deflection of the belt buckle towards the vehicle seat a lesser resistance than away from it.

In accordance with one aspect of the invention, an elastically deflectable supporting part is provided which at the side of the fitting, which in the fitted conditions is directed away from an associated vehicle seat, contacts the fitting and increases the bending resistance moment of the anchorage in the direction of the supporting part. The additionally provided supporting part increases in the fitted condition of the anchorage the bending resistance moment thereof in the direction laterally away from the associated vehicle seat, whereas by contrast the belt buckle is adjustable towards the vehicle seat without necessitating any greater force.

In accordance with the preferred embodiment, the supporting part is located pretensioned at the preferred elastically deflectable fitting in the non bent condition, i.e. in the basic position in the vehicle, thus preventing rattling in the anchorage when the vehicle is on the move.

In accordance with a further preferred embodiment, the fitting and the supporting part each and/or together form a leaf spring pack whereby the supporting part is coupled to the fitting merely at its vehicle floor end and contacts the fitting by its belt buckle end, the supporting part accordingly increasing the bending resistance only in one direction.

The belt buckle end of the supporting part is preferably rounded in the direction of the fitting so that the wear due to the movements of the parts relative to each other is reduced and tacking of the parts to each other due to soilage or corrosion between the parts is practically avoidable.

DETAILED DESCRIPTION OF PREFERRED EMBODIMENTS

Figure 1:
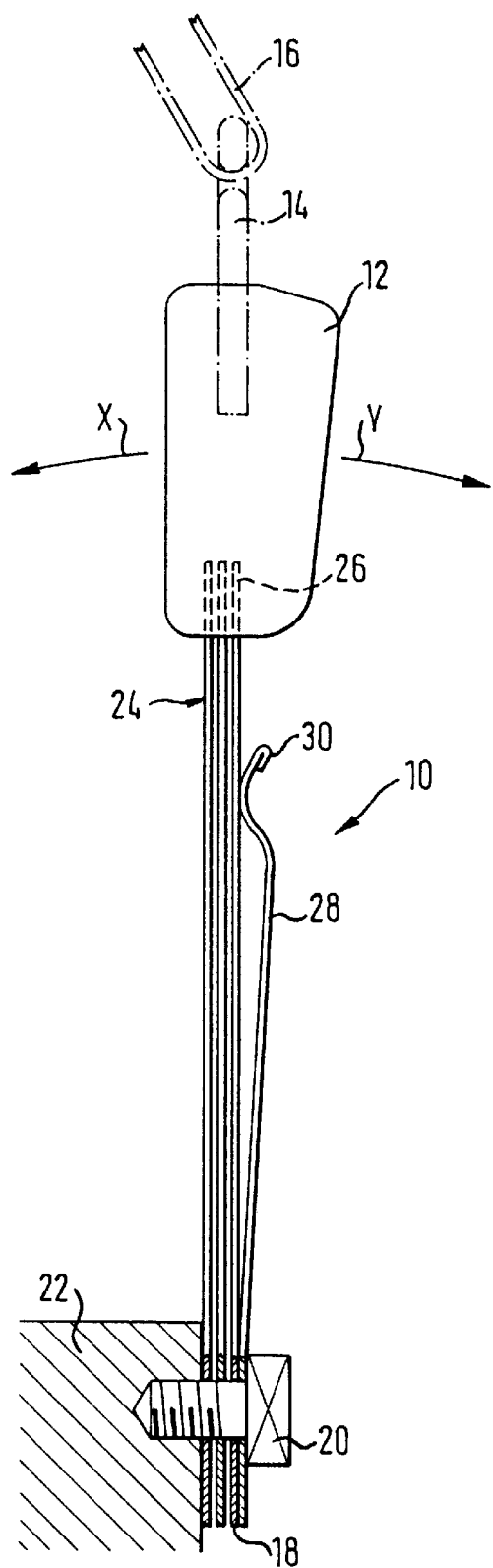
FIG. 1 is a schematic side view of an anchorage according to the invention secured in a vehicle for a belt buckle.

In FIG. 1 an anchorage 10 for a belt buckle 12 is shown. A buckle tongue 14 of a seat belt 16 is latched in place in the belt buckle 12 in the position shown in FIG. 1. At the vehicle floor end 18 of the anchorage 10 the latter is connected by a screw 20 to the frame 22 of a vehicle seat (not shown) extending in the direction X. The anchorage 10 comprises a fitting 24 made up of several leaf springs located one on the other and at the belt buckle end 26 of which the belt buckle 12 is secured. The anchorage 10 includes further an elastically deflectable supporting part 28 which contacts the fitting 24 at the side facing away from the vehicle seat assigned thereto in a biased condition. The supporting part 28 is also configured as a leaf spring, it being permanently deformed such that it presses against the fitting 24 by its belt buckle end 30 after being secured to the fitting 24 by the common screw 20. The belt buckle end 30 is bowed so that a low-friction line contact results between the supporting part 28 and the fitting 24 in the region of the end 30. By coating at least the supporting part 28 at its end 30 the friction between the fitting 24 and the supporting part 28 is further diminished.

Together the fitting 24 and the supporting part 28 constitute a leaf spring pack whereby the fitting 24 and the supporting part 28 may each constitute a separate leaf spring or be made up of a separate leaf spring pack. As a result of the number of leaf springs each located on the other, their dimensioning and their material selection, the bending resistance moment of the anchorage 10 in the direction X, i.e. in the direction of the vehicle seat, and in the direction Y, i.e. in the direction away from the vehicle seat can be selected as desired. Since the supporting part 28 is connected to the fitting 24 only at the vehicle floor end 18 and contacts the fitting 24 at the belt buckle end 30, the supporting part 28 counteracts any bending of the anchorage 10 only in the direction Y, but not in the direction X. In the direction Y the supporting part 28 stabilizes the position of the fitting 24 so that a vehicle occupant when buckling up is able to more easily latch the buckle tongue 14 in the belt buckle 12, due to it being unable to be moved laterally. The pliancy of the fitting can thus be designed high enough to allow an optimum run of the belt webbing to materialize when the belt is buckled up.

Figure 2:
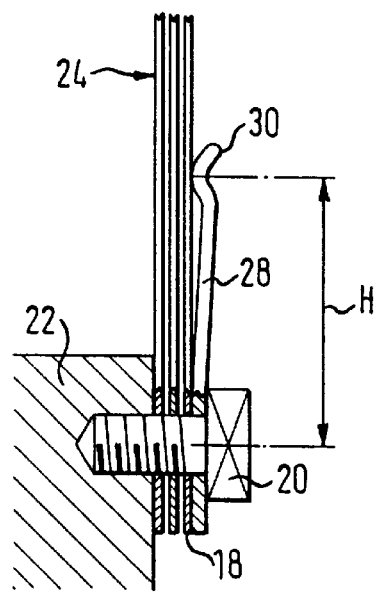
FIG. 2 shows the vehicle floor end of a second embodiment of the anchorage according to the invention having a short supporting part.

In the embodiment shown in FIG. 2 the supporting part 28 is configured relatively short so that the lever arm H from the middle of the screw 20 to the line touching the belt buckle end 30 is smaller than in the case of the embodiment shown in FIG. 1. As a result of this a lesser bending resistance moment of the anchorage 10 materializes in the direction X than in the case of the embodiment shown in FIG. 1.

Figure 3:
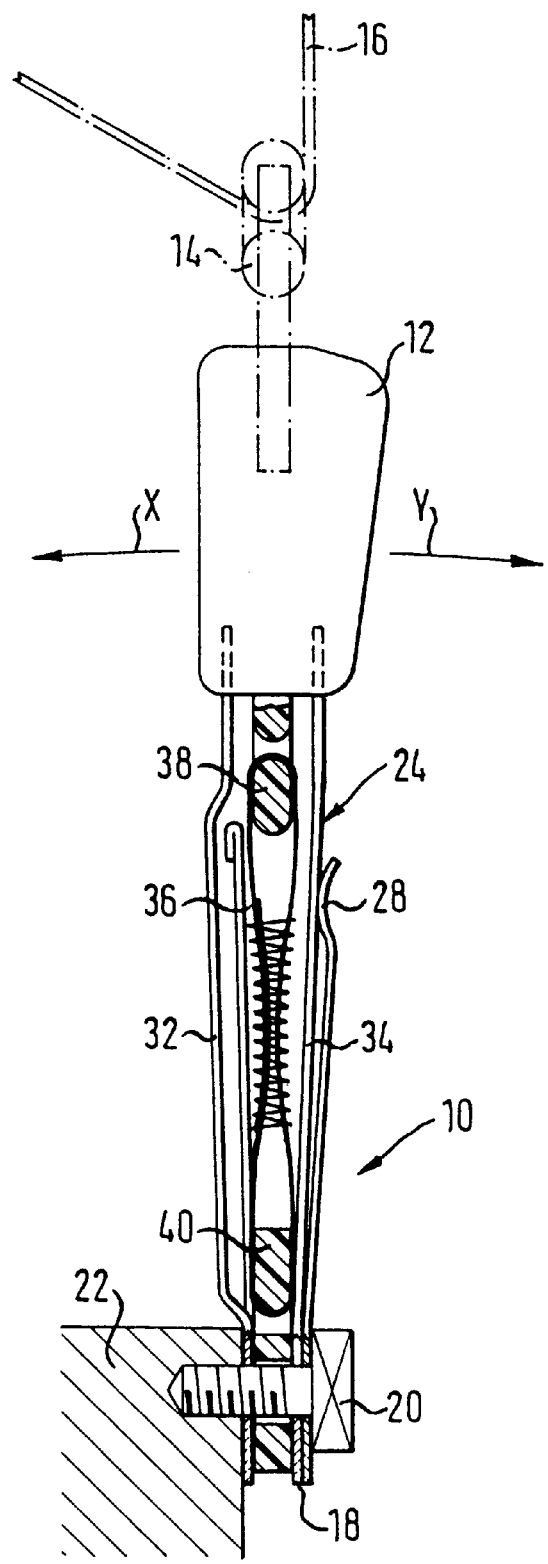
FIG. 3 shows a third embodiment of the anchorage featuring belt webbings.

The embodiment of the anchorage shown in FIG. 3 differs from those of FIGS. 1 and 2 by the fitting 24 comprising two supporting elements 32, 34 oriented essentially parallel to each other, between which a loop of belt webbing 36 extends which, on the one hand, runs through a lug 38 molded to the belt buckle 12 at the belt buckle end and, on the other, through a lug 40 at the vehicle floor end.

On the side of the supporting element 34 facing the direction Y the supporting part 28 contacts the supporting element 34 pretensioned. The screw 20 serves as a common fastener element for the supporting part 28, the supporting element 34, the lug 40 and the supporting element 32 to attach the thereby resulting anchorage 10 to the vehicle seat frame 22 or directly to the vehicle floor. The belt webbing 36, the opposing sides of which are secured to each other between the lugs 38 and 40, receives the tensile force generated in a retraction case in the seat belt 16 whilst the supporting elements 32, 34 hold the belt buckle in the upright position. In this embodiment the pliancy of the anchorage 10 in the direction X is particularly high.

Figure 4:
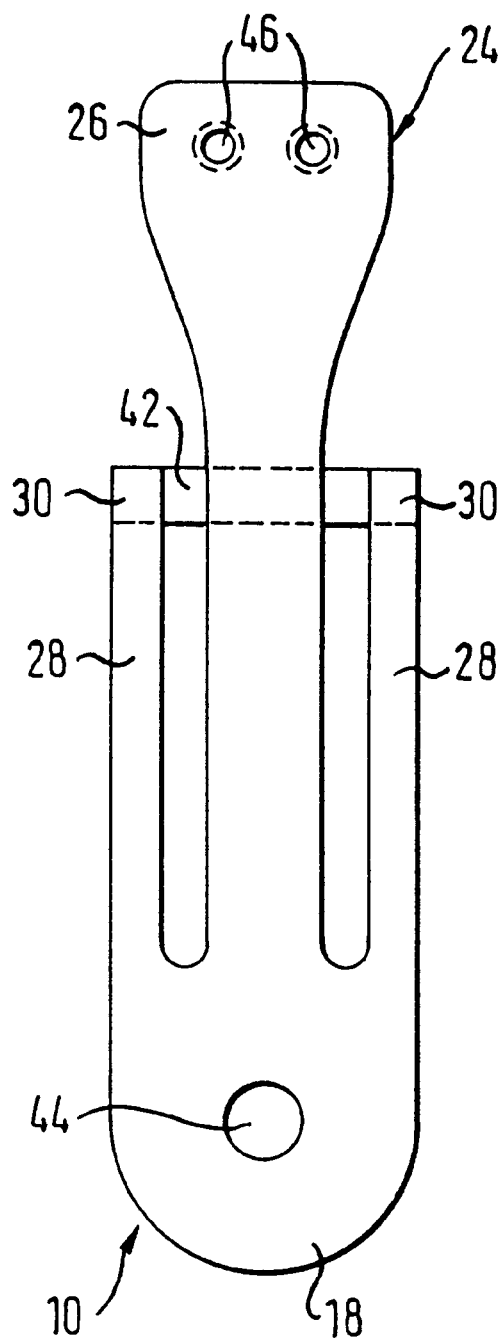
FIG. 4 is a plan view of a fourth embodiment of the anchorage in which the fitting and supporting part are configured integrally.
Figure 5:
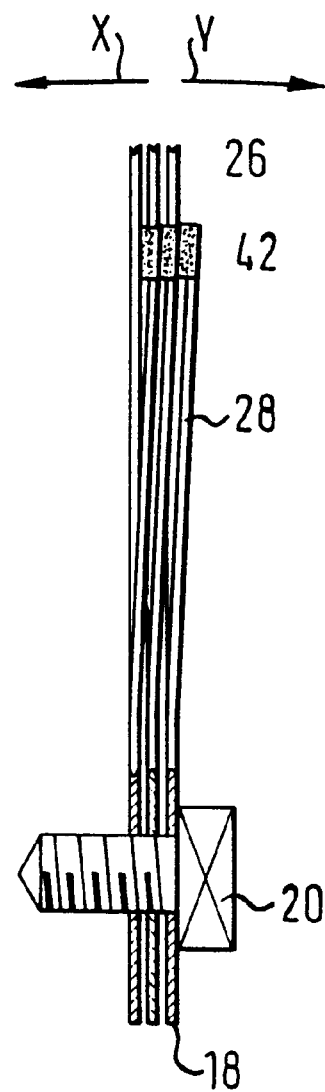
FIG. 5 is a side view of the anchorage shown in FIG. 4.

In the embodiment shown in the FIGS. 4 and 5 the anchorage 10 has all-in-all the shape of a three-pronged fork, the middle, longer prong of which forms the fitting 24 and the outer prongs of which are joined to each other at the belt buckle ends 30 by a bridging section 42. This bridging section 42 which forms an elongation of the two-part supporting part 28 contacts the fitting 24, as is evident from FIG. 5. The anchorage 10 shown in FIG. 4 is preferably a stamped item of an originally flat spring sheet metal, to which merely the bridging section 42 needs to be fastened. Since the supporting part 28 without the bridging section 42, and the fitting 24 are originally located in a single plane, from which due to provision of the bridging section 42 the supporting part 28 protrudes, the bridging section 42 is always in contact with the fitting 24 in a biased condition without it necessitating a permanent deformation of the supporting part 28.

The anchorage 10 shown in the FIGS. 4 and 5 may be configured single-layer or be made up of several stampings located one on the other so that a leaf spring pack results.

For installing the anchorage 10 an opening 44 is provided at the vehicle floor end 18, and for securing the belt buckle 12 tappings 46 are provided at the belt buckle end 26.

In this embodiment too, the bending resistance moment is high in the direction Y, i.e. away from the vehicle seat, due to the supporting part 28, whereas in the direction X it is relatively low.

For reasons of better appearance and safe handling, the anchorage 10 may be sheathed in shrinkage tubing in each of the embodiments shown.

I claim:

1. A belt buckle arrangement, comprising:

a belt buckle, an anchorage for fixing said belt buckle to a vehicle close to a vehicle seat to which said belt buckle is assigned;

said anchorage having a flexible fitting with a belt buckle end and an opposed vehicle floor end;

said belt buckle being secured to said fitting on said belt buckle end;

said belt buckle having an inner side facing said vehicle seat in the state when said belt buckle arrangement is fixed to the vehicle and an opposing outer side facing away from the vehicle seat;

said belt buckle being laterally deflectable in a direction towards the vehicle seat bringing said inner side closer to the vehicle seat, and in an opposite direction, away from the vehicle seat; and means for supporting said fitting opposing a deflection of said belt buckle towards the vehicle seat a lesser resistance than away from the vehicle seat.

2. The belt buckle arrangement as set forth in claim 1, wherein said fitting is elastically deflectable.

3. The belt buckle arrangement as set forth in claim 1, wherein said fitting includes at least one elastically deflectable supporting element which maintains said belt buckle in an upright position, and a belt webbing loop which is secured to said belt buckle and to the vehicle.

4. The belt buckle arrangement as set forth in claim 1, wherein at least one of said fitting and said supporting part forms a leaf spring pack and wherein said supporting part has a belt buckle end and an opposed vehicle floor end and is coupled to said fitting merely at its vehicle floor end and contacts said fitting by its belt buckle end.

5. The belt buckle arrangement as set forth in claim 4, wherein said belt buckle end of said supporting part is rounded towards said fitting.

6. The belt buckle arrangement as set forth in claim 5, wherein said fitting has a vehicle floor end and wherein said fitting and said supporting part are integrally joined to each other at their vehicle floor ends.

7. The belt buckle arrangement as set forth in claim 6, wherein said fitting with said supporting part has the shape of a fork with three prongs and a bridging section, the middle, longer prong of which forming said fitting and the outer prongs of which are joined to each other at their belt buckle ends by said bridging section which is in contact with said fitting and together with said outer prongs forms said supporting part.

8. The belt buckle arrangement as set forth in claim 1, wherein said anchorage has an elastically deflectable supporting part which supports said fitting and is arranged at the side of said fitting facing away from the vehicle seat.

9. The belt buckle arrangement as set forth in claim 8, wherein said supporting part contacts said fitting in a biased condition.

10. The belt buckle arrangement as set forth in claim 8, wherein said supporting part is configured as a leaf spring.

11. A belt buckle arrangement, comprising:

a belt buckle, and;

an anchorage for fixing said belt buckle to a vehicle close to a vehicle seat to which said belt buckle is assigned;

said anchorage having a flexible fitting with a belt buckle end and an opposed vehicle floor end;

said belt buckle being secured to said fitting on said belt buckle end;

said belt buckle having an inner side facing the vehicle seat in the state when the belt buckle arrangement is fixed to the vehicle and an opposing outer side facing away from the vehicle seat;

said belt buckle being laterally deflectable in a direction towards the vehicle seat bringing the inner side closer to the vehicle seat, and in an opposing direction, away from the vehicle seat; and comprising means for increasing the resistance of said flexible fitting opposing a deflection of said belt buckle away from the vehicle seat such that the resistance opposing said deflection towards the seat is lesser than the resistance away from the vehicle seat.

12. A belt buckle arrangement, comprising:

a belt buckle;

an anchorage for fixing said belt buckle to a vehicle adjacent to a vehicle seat;

said anchorage having a flexible fitting with a belt buckle end and a vehicle floor end for securing said fitting to a vehicle floor;

said belt buckle being secured to said belt buckle end of said fitting;

said belt buckle having a first side for facing in a first direction toward the vehicle seat when said belt buckle arrangement is fixed to the vehicle, said belt buckle having a second side opposite said first side for facing in a second direction away from the vehicle seat when said belt buckle arrangement is fixed to the vehicle;

said belt buckle being laterally deflectable in said first and second directions; and means for supporting said flexible fitting and resisting deflection of said belt buckle in said first direction with a first force, said supporting means resisting deflection of said belt buckle in said second direction with a second force larger than said first force.

* * * * *